US010766654B2

(12) United States Patent
Suzuki et al.

(10) Patent No.: US 10,766,654 B2
(45) Date of Patent: Sep. 8, 2020

(54) INSPECTION DEVICE AND PRODUCTION MANAGEMENT METHOD

(71) Applicants: KYODO YUSHI CO., LTD., Fujisawa-shi, Kanagawa (JP); TORAY ENGINEERING CO., LTD., Chuo-ku, Tokyo (JP)

(72) Inventors: Yoichi Suzuki, Kameyama (JP); Toshikazu Kawado, Kasaoka (JP); Chisa Inaka, Otsu (JP); Tatsuya Okada, Otsu (JP)

(73) Assignees: KYODO YUSHI CO., LTD., Fujisawa-shi, Kanagawa (JP); TORAY ENGINEERING CO., LTD., Tokyo (JP)

( * ) Notice: Subject to any disclaimer, the term of this patent is extended or adjusted under 35 U.S.C. 154(b) by 15 days.

(21) Appl. No.: 16/309,429

(22) PCT Filed: Apr. 28, 2017

(86) PCT No.: PCT/JP2017/017010
§ 371 (c)(1),
(2) Date: Dec. 12, 2018

(87) PCT Pub. No.: WO2017/217127
PCT Pub. Date: Dec. 21, 2017

(65) Prior Publication Data
US 2019/0308762 A1    Oct. 10, 2019

(30) Foreign Application Priority Data

Jun. 13, 2016 (JP) ................................ 2016-117273

(51) Int. Cl.
*G01N 21/88* (2006.01)
*B65B 57/00* (2006.01)
(Continued)

(52) U.S. Cl.
CPC .............. *B65B 57/00* (2013.01); *B65B 55/22* (2013.01); *G01N 21/64* (2013.01); *G01N 21/88* (2013.01);
(Continued)

(58) Field of Classification Search
CPC .......... B65B 57/00; B65B 55/22; G01N 21/88
See application file for complete search history.

(56) References Cited

U.S. PATENT DOCUMENTS 6,902,527 B1    6/2005  Doguchi et al.
2002/0138974 A1*  10/2002  Suhara ............... H05K 13/0812
                                                     29/740
(Continued)

FOREIGN PATENT DOCUMENTS

JP    H09-288067 A    11/1997
JP    2001-29313 A    2/2001
(Continued)

OTHER PUBLICATIONS

International Search Report for PCT Application No. PCT/JP2017/017010, dated Aug. 1, 2017, in 4 pages.

*Primary Examiner* — Hugh Maupin
(74) *Attorney, Agent, or Firm* — Knobbe, Martens, Olson & Bear, LLP

(57) ABSTRACT

An inspection device (1) includes a light source (10) projecting excitation light to an inner surface of a container (20); an imager (11) capturing a fluorescence image of fluorescence emitted from a foreign substance in response to the excitation light projected; and a detector (13) detecting the foreign substance adhering to the inner surface of the container from the fluorescence image captured by the imager. The foreign substance contains a material emitting fluorescence in response to the excitation light projected to the material. The detector includes a calculator (14) calculating an average brightness value in an inspection target
(Continued)

region, and an adjuster (15) adjusting an image-capturing condition where the fluorescence image is captured such that the average brightness value falls within a preset range.

17 Claims, 8 Drawing Sheets

(51) Int. Cl.
    *G01N 21/64*     (2006.01)
    *G01N 21/94*     (2006.01)
    *G01N 21/90*     (2006.01)
    *B65B 55/22*     (2006.01)
    *G05B 19/418*     (2006.01)

(52) U.S. Cl.
    CPC .............. *G01N 21/90* (2013.01); *G01N 21/94* (2013.01); *G05B 19/418* (2013.01)

(56) References Cited

U.S. PATENT DOCUMENTS

| | | | |
|---|---|---|---|
| 2005/0139486 A1* | 6/2005 | Carson | A62D 3/115 205/688 |
| 2011/0049387 A1 | 3/2011 | Hahn | |
| 2013/0286381 A1* | 10/2013 | Some | G01N 21/51 356/72 |
| 2016/0072993 A1* | 3/2016 | Hartrumpf | G06T 7/97 348/92 |

FOREIGN PATENT DOCUMENTS

| | | |
|---|---|---|
| JP | 2006-223446 A | 8/2006 |
| JP | 2008-14652 A | 1/2008 |
| JP | 2010-257407 A | 11/2010 |
| JP | 2013-512528 A | 4/2013 |
| JP | 2014-232061 A | 12/2014 |
| JP | 2016-99149 A | 5/2016 |

\* cited by examiner

INSPECTION DEVICE AND PRODUCTION MANAGEMENT METHOD

CROSS-REFERENCE TO RELATED APPLICATIONS

This application is the U.S. National Phase under 35. U.S.C. § 371 of International Application PCT/JP2017/017010, filed Apr. 28, 2017, which claims priority to Japanese Patent Application No. 2016-117273, filed Jun. 13, 2016. The disclosures of the above-described applications are hereby incorporated by reference in their entirety.

TECHNICAL FIELD

The present invention relates to an inspection device for inspecting a foreign substance or a residue adhering to the inside of the container, and a production management method for managing a production line along which a container is filled with a lubricant, using the inspection device.

BACKGROUND ART

As a method for inspecting a foreign substance or a residue (hereinafter simply referred to as a "foreign substance") adhering to the inside of the container, Patent Document 1 discloses a method in which a foreign substance or any other substance adhering to the inside of the drum is inspected using an image of the inside of the drum. In this method, an illuminating lamp and a camera are inserted into the drum, and while the inside of the drum is illuminated with the illuminating lamp, the image is captured by the camera.

CITATION LIST

Patent Document

[Patent Document 1] Japanese Unexamined Patent Publication No. H09-288067

SUMMARY OF THE INVENTION

Technical Problem

However, if the inside of a container is illuminated with the illuminating lamp, and in this state, an image of the inside of the container is captured by the camera, light from the illuminating lamp undergoes multiple reflection from an inner surface of the container, thereby generating strong noise. This makes it difficult to detect light reflected from a minute foreign substance from the image captured by the camera.

It is therefore a main object of the present invention to provide an inspection device capable of detecting a foreign substance adhering to the inside of a container without being affected by multiple reflection even if the adhering foreign substance is minute, and a production management method for managing a production line along which the container is filled with a lubricant, using the inspection device.

Solution to the Problem

An inspection device according to the present invention is directed to an inspection device for inspecting a foreign substance adhering to an inner surface of the container. The device includes: a light source projecting excitation light to the inner surface of the container; an imager capturing a fluorescence image of fluorescence emitted from the foreign substance in response to the excitation light projected; and a detector detecting the foreign substance adhering to the inner surface of the container from the fluorescence image captured by the imager. The foreign substance contains a material emitting fluorescence in response to excitation light projected thereto. The detector includes a calculator calculating an average brightness value of the excitation light projected to the inner surface of the container in an inspection target region based on the fluorescence image captured by the imager, and an adjuster adjusting an image-capturing condition where the fluorescence image is captured such that the average brightness value calculated by the calculator falls within a preset range.

A production management method according to the present invention is directed to a production management method for a production line along which a container is filled with a lubricant. The method includes: a cleaning step of cleaning an inner surface of the container before filling the container with the lubricant; and an inspection step of inspecting a residue adhering to the inner surface of the container after the cleaning step. The residue contains a material emitting fluorescence in response to excitation light projected thereto. The inspection step includes sub-steps of: projecting excitation light to the inner surface of the container; capturing a fluorescence image of fluorescence emitted from the residue in response to the excitation light projected; and calculating an average brightness value of the excitation light projected to the inner surface of the container in an inspection target region based on the fluorescence image captured; and detecting the residue adhering to the inner surface of the container from the fluorescence image captured. An image-capturing condition where the fluorescence image is captured is adjusted such that the average brightness value calculated falls within a preset range.

Advantages of the Invention

The present invention can provide an inspection device capable of detecting a foreign substance adhering to the inside of a container without being affected by multiple reflection even if the adhering foreign substance is minute, and a production management method for managing a production line along which the container is filled with a lubricant, using the inspection device.

DESCRIPTION OF EMBODIMENTS

Suppose the wavelength of light projected to an inner surface of a container is different from that of light emitted by a foreign substance reacting with the light projected. In that case, even if the light projected undergoes multiple reflection from the inner surface of the container, detecting light that does not include a wavelength component equal to the wavelength of the light projected enables detection of a minute foreign substance without being affected by multiple reflection of the light projected.

For example, if a foreign substance adhering to a container is made of a fluorescent material such as an organic substance, excitation light such as ultraviolet light is projected to the inner surface of the container, and fluorescence emitted from the foreign substance in response to the excitation light projected is detected, thereby detecting the minute foreign substance adhering to the container without being affected by multiple reflection of the excitation light.

However, the inner surface of the container coated with, for example, an anticorrosive coating, which is made of a material containing an organic substance, causes the container to also emit fluorescence. For this reason, fluorescence emitted from a foreign substance and fluorescence emitted from the inner surface of the container coexist. Thus, a minute foreign substance is not necessarily easy to detect.

The present inventors have discovered that even if the inner surface of the container is coated with a fluorescent material, adjusting, within an appropriate range, an image-capturing condition where a fluorescence image of fluorescence emitted from a foreign substance is captured enables detection of a minute foreign substance adhering to the container without being affected by fluorescence from the container. As a result, the present inventors have conceived the present invention.

Embodiments of the present invention will now be described in detail with reference to the drawings. The present invention is not limited to the following embodiments. Various changes and modifications may be made without departing from the scope of the present invention.

Figure 1:
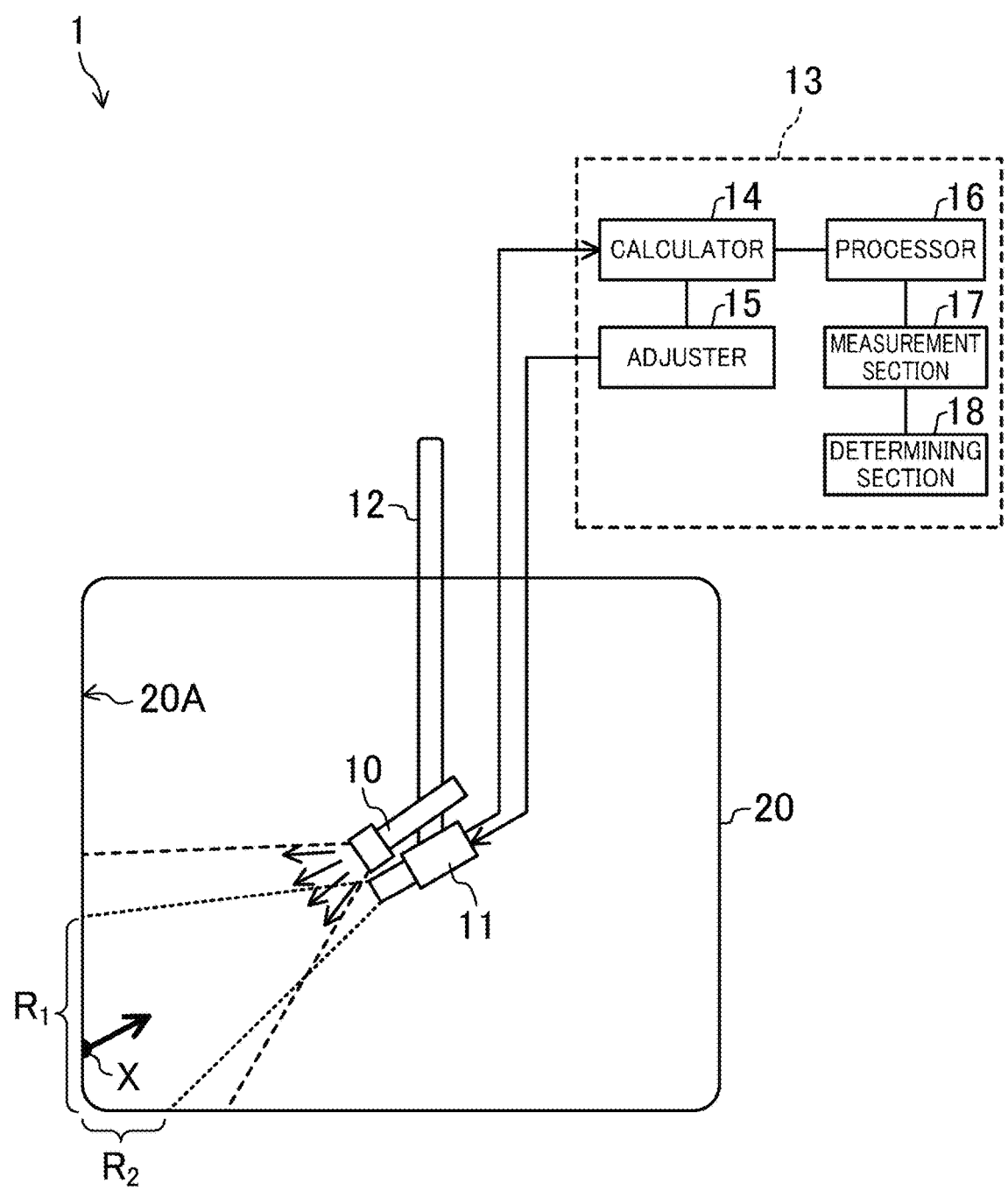
FIG. 1 schematically shows a configuration of an inspection device according to an embodiment of the present invention.

FIG. 1 schematically shows a configuration of an inspection device 1 according to an embodiment of the present invention.

As shown in FIG. 1, the inspection device 1 according to this embodiment is an inspection device that inspects a foreign substance X adhering to an inner surface 20A of the container 20. The inner surface 20A of the container 20 is coated with an anticorrosive material. The container 20 may have any shape as long as it is an object having an internal space where multiple reflection occurs. The "object having an internal space" as used herein refers to an object having inner surfaces facing each other and/or inner surfaces adjacent to each other, and having an internal space defined inside the inner surfaces, i.e., an object having an internal space where multiple reflection occurs. Examples of the "object having an internal space" include pipes, grooved objects (channels), angular objects in addition to containers formed as bottomed boxes or tubular bodies. In the following description, the "object having an internal space" is simply referred to as a "container." Here, as one type of the foreign substance X, a substance that emits fluorescence in response to excitation light projected thereto is exemplified.

As shown in FIG. 1, the inspection device 1 includes a light source 10 that projects excitation light to the inner surface 20A of the container 20, an imager 11 that captures a fluorescence image of fluorescence emitted from the foreign substance X in response to the excitation light projected, and a detector 13 that detects the foreign substance X adhering to the inner surface 20A of the container 20 from the fluorescence image captured by the imager 11.

The light source 10 and the imager 11 are disposed in the internal space of the container 20. The excitation light projected from the light source 10 illuminates inspection target regions $R_1$ and $R_2$ of the inner surface 20A of the container 20 in the directions indicated by the arrows. Fluorescence emitted in response to the excitation light projected enters the imager 11 from the foreign substance X adhering to the inspection target regions $R_1$ and $R_2$ of the inner surface 20A, and a fluorescence image of the fluorescence emitted from the foreign substance X is thus captured.

The inner surface 20A of the container 20 is divided into several regions including the inspection target regions $R_1$ and $R_2$ illustrated in FIG. 1. The inspection target regions $R_1$ and $R_2$ include a portion of a side surface and a portion of the bottom of the container 20, respectively. The light source 10 and the imager 11 are coupled together through a coupling member 12. Moving or rotating the coupling member 12 allows the inspection target regions to be determined.

The excitation light emitted from the light source 10 illuminates the inner surface 20A of the container 20 at an inclination angle. An inclination angle of the imager 11 relative to the inner surface 20A of the container 20 is determined such that the inspection target regions $R_1$ and $R_2$ of which images are captured by the imager 11 are located inside a region illuminated with the light source 10.

In this embodiment, the foreign substance X adhering to the inner surface of the container 20 contains a material that emits fluorescence in response to the excitation light projected. Examples of the foreign substance X include substances containing an organic material or fluorescent substances except organic materials (e.g., some of semiconductor materials or some of minerals).

Examples of the light source 10 that can be used include, in addition to an LED or a laser that emits ultraviolet light, a mercury lamp and a halogen light emitting light with ultraviolet components. Furthermore, examples of the imager 11 that can be used include an imaging camera including an imaging element having responsivity to the wavelength of a fluorescent component emitted from the foreign substance X.

The detector 13 includes a calculator 14 that calculates an average brightness value of the excitation light projected to the inner surface 20A of the container 20 in the inspection target regions $R_1$ and $R_2$ based on the fluorescence image captured by the imager 11, and an adjuster 15 that adjusts the image-capturing condition where the fluorescence image is captured, such that the average brightness value calculated by the calculator 14 falls within a preset range.

The detector 13 may further include a processor 16 that smooths the fluorescence image captured by the imager 11, a measurement section 17 that measures the number of adhering foreign substances X and the locations to which the foreign substances X adhere based on the fluorescent image captured by the imager 11, and a determining section 18 that compares the number of the adhering foreign substances X measured by the measurement section 17 with a preset reference value.

Next, the principle of detecting a foreign substance X adhering to the inner surface 20A of the container 20 from the fluorescence image captured by the imager 11 in this embodiment will be described with reference to FIGS. 2A to 2C.

Figure 2A:
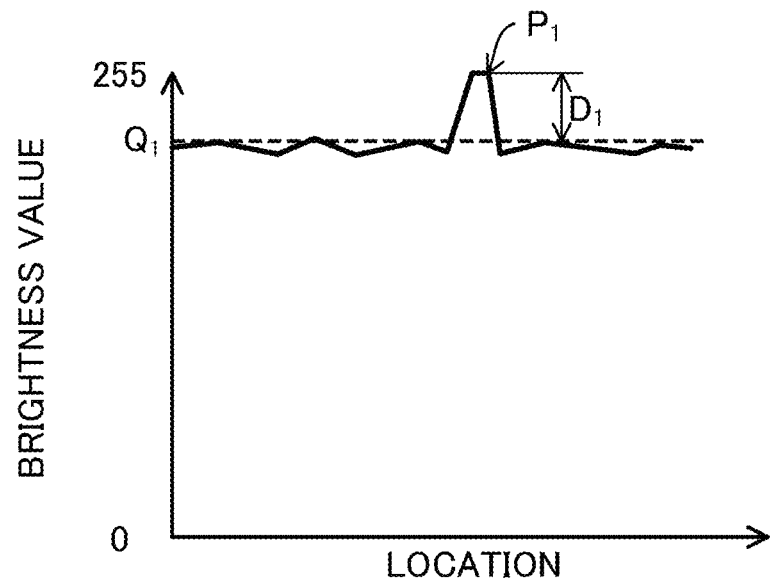
FIGS. 2A to 2C are graphs showing variations among brightness values of fluorescence images captured under different image-capturing conditions in an inspection target region.
Figure 2B:
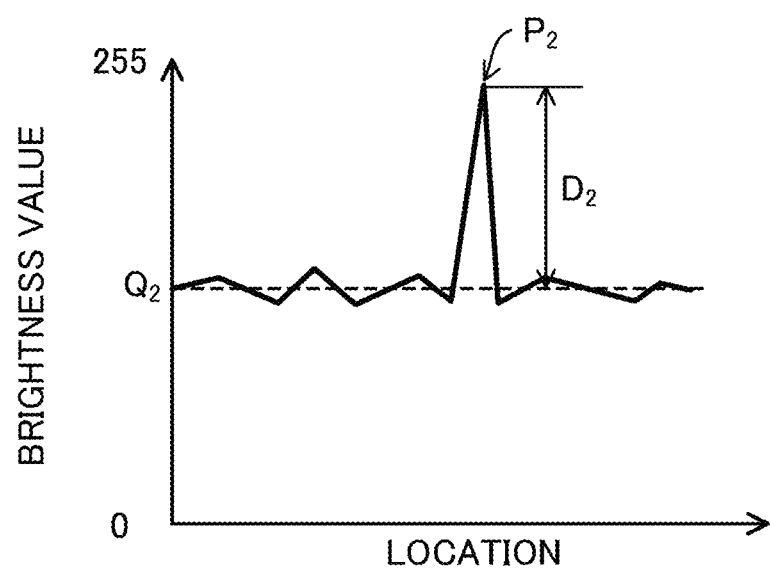
Figure 2C:
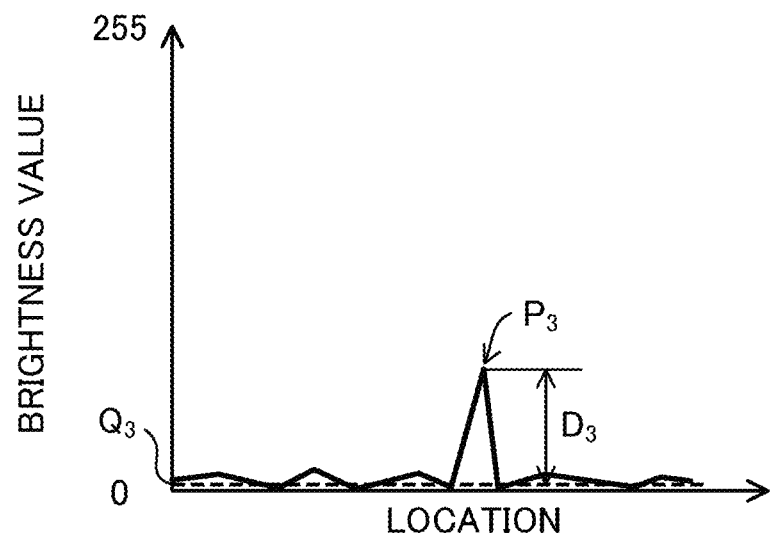

FIGS. 2A to 2C are graphs showing variations among brightness values of fluorescence images captured under different image-capturing conditions in an inspection target region. Here, the exposure time is shortened in the order of FIGS. 2A to 2C as the image-capturing condition. In the graphs, the values $P_1$ to $P_3$ each indicate the brightness value of fluorescence from the foreign substance X, and the values $Q_1$ to $Q_3$ each indicate the average brightness value, calculated by the calculator 14, in the inspection target region. Note that the imager 11 provides 256-level gray scale, a brightness value of zero indicates black, and a brightness value of 255 indicates white.

As shown in FIG. 2A, a long exposure time increases the average brightness value $Q_1$, and the difference $D_1$ between the average brightness value $Q_1$ and the brightness value $P_1$ of the fluorescence from the foreign substance X is small. This is because an excessively long exposure time increases the amount of fluorescence from the foreign substance X, and the brightness value $P_1$ of the fluorescence from the foreign substance X approaches the upper limit (255) of the level of gray scale of the imager 11, and saturates.

On the other hand, as shown in FIG. 2(b), a shorter exposure time reduces the average brightness value $Q_2$, whereas the brightness value $P_2$ of the fluorescence from the foreign substance X does not decrease so much. This is because the brightness value $P_2$ of the fluorescence from the foreign substance X is not saturated, and the fluorescence emitted from the foreign substance X is correctly detected by the imager 11. As a result, the difference $D_2$ between the brightness value $P_2$ of the fluorescence from the foreign substance X and the average brightness value $Q_2$ increases.

However, as shown in FIG. 2C, a still shorter exposure time further reduces the average brightness value $Q_3$, and significantly reduces the brightness value $P_3$ of the fluorescence from the foreign substance X as well. This is because an excessively short exposure time causes the amount of the fluorescence from the foreign substance X to be too small to obtain a sufficient brightness value $P_3$. As a result, the difference $D_3$ between the brightness value $P_3$ of the fluorescence from the foreign substance X and the average brightness value $Q_3$ is again reduced.

As can be seen from the foregoing description, an excessively long or short exposure time reduces the difference between the brightness value of the fluorescence from the foreign substance X and the average brightness value. In some cases, the brightness value of the fluorescence from the foreign substance X is substantially equivalent to the average brightness value. Capturing a fluorescence image under such an image-capturing condition makes it difficult to detect the foreign substance X with the brightness value of the fluorescence from the foreign substance X distinguished.

On the other hand, if the adjuster 15 adjusts the image-capturing condition (exposure time) where the fluorescence image is captured such that the average brightness value, calculated by the calculator 14, in the inspection target region falls within the preset range (i.e., the appropriate range), the foreign substance X can be detected with the brightness value of the fluorescence from the foreign substance X distinguished. This enables detection of a minute foreign substance adhering to the inner surface 20A of the container 20 without being affected by fluorescence from the inner surface 20A of the container 20 even if the inner surface 20A of the container 20 is coated with a fluorescent material.

The preset appropriate range of the average brightness value is set, prior to an actual inspection, by determining whether or not the difference between the average brightness value calculated by the calculator 14 and the brightness value of the fluorescence image of fluorescence emitted from the foreign substance X is greater than or equal to a predetermined value, based on the fluorescence image of fluorescence from the foreign substance X contained in the inspection target region. Alternatively, the range may be set by determining whether or not the brightness value of the fluorescence from the foreign substance X can be sufficiently distinguished.

Here, the average brightness value can be modified by changing the image-capturing time. Otherwise, it may be modified by changing the gain of the imager 11 capturing the fluorescence image or the amount of excitation light emitted from the light source 10.

Figure 3:
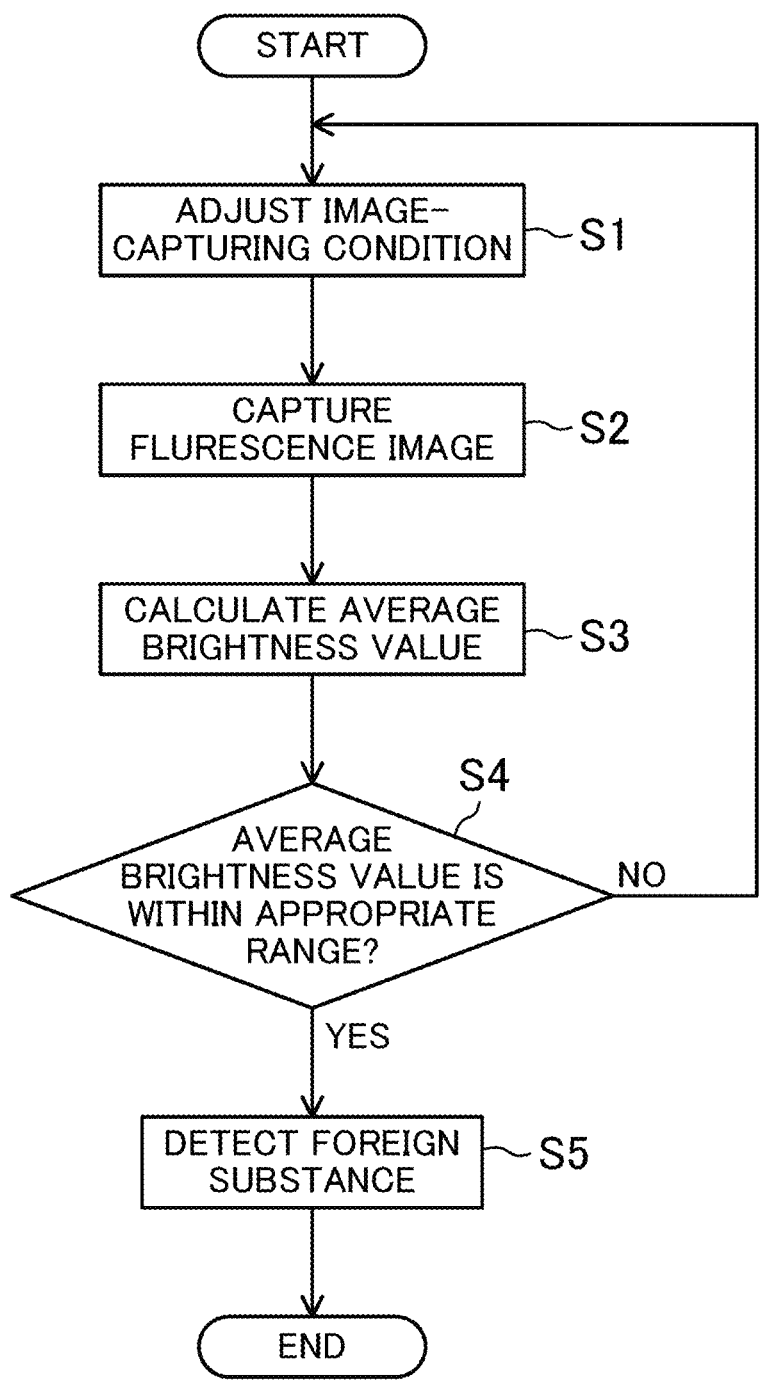
FIG. 3 is a flowchart showing a procedure for detecting a foreign substance adhering to an inner surface of a container.

FIG. 3 is a flowchart showing a procedure for detecting the foreign substance X adhering to the inner surface 20A of the container 20 using the inspection device 1 according to this embodiment.

First, in step S1, the light source 10 that emits excitation light and the imager 11 that captures a fluorescence image of fluorescence emitted from a foreign substance in response to the excitation light projected thereto are arranged in the container 20, and then an image-capturing condition is adjusted.

Next, in step S2, the imager 11 captures a fluorescence image of fluorescence emitted in response to the excitation light projected into the container 20.

Next, in step S3, the calculator 14 calculates an average brightness value of the excitation light projected to the inner surface 20A of the container 20 in an inspection target region based on the fluorescence image captured by the imager 11.

Next, in step S4, a determination is made whether or not the average brightness value calculated by the calculator 14 is within an appropriate range. This determination can be made, for example, based on whether or not the difference between the average brightness value and the brightness value of the fluorescence from the foreign substance X is great enough to allow the brightness value of the fluorescence from the foreign substance X to be sufficiently distinguished.

If a determination is made that the average brightness value is not within the appropriate range, the process again returns to step S1 to adjust the image-capturing condition. For example, as shown in FIGS. 2A to 2C, an adjustment is made, for example, such that if the average brightness value is too high, the exposure time is shortened, and if the average brightness value is too low, the exposure time is lengthened.

After the image-capturing condition is readjusted in this way, steps S2 and S3 are undergone, and in step S4, a determination is again made whether or not the average brightness value is within the appropriate range.

If a determination is made that the average brightness value is within the appropriate range, foreign substances adhering to the inner surface 20A of the container 20 are detected from the fluorescence image captured by the imager 11 in step S5. Then, the measurement section 17 measures the number of the adhering foreign substances and the locations to which the foreign substances adhere.

If the inner surface 20A of the container 20 is divided into a plurality of inspection target regions, images of which are captured, steps S1 to S5 are repeated for each inspection target region to detect foreign substances on the inner surface 20A of the container 20.

For example, if the inner surface 20A of the container 20 is coated with an anticorrosive coating, uneven coating results in variations in the brightness value of the fluorescence image. If the fluorescence emitted from the inner surface 20A of the container 20 undergoes multiple reflection from another surface, then the brightness value of the fluorescence image varies even on this surface. Such variations in brightness value (hereinafter referred to as "fluorescence variations") may reduce the accuracy with which foreign substances are detected.

Figure 4:
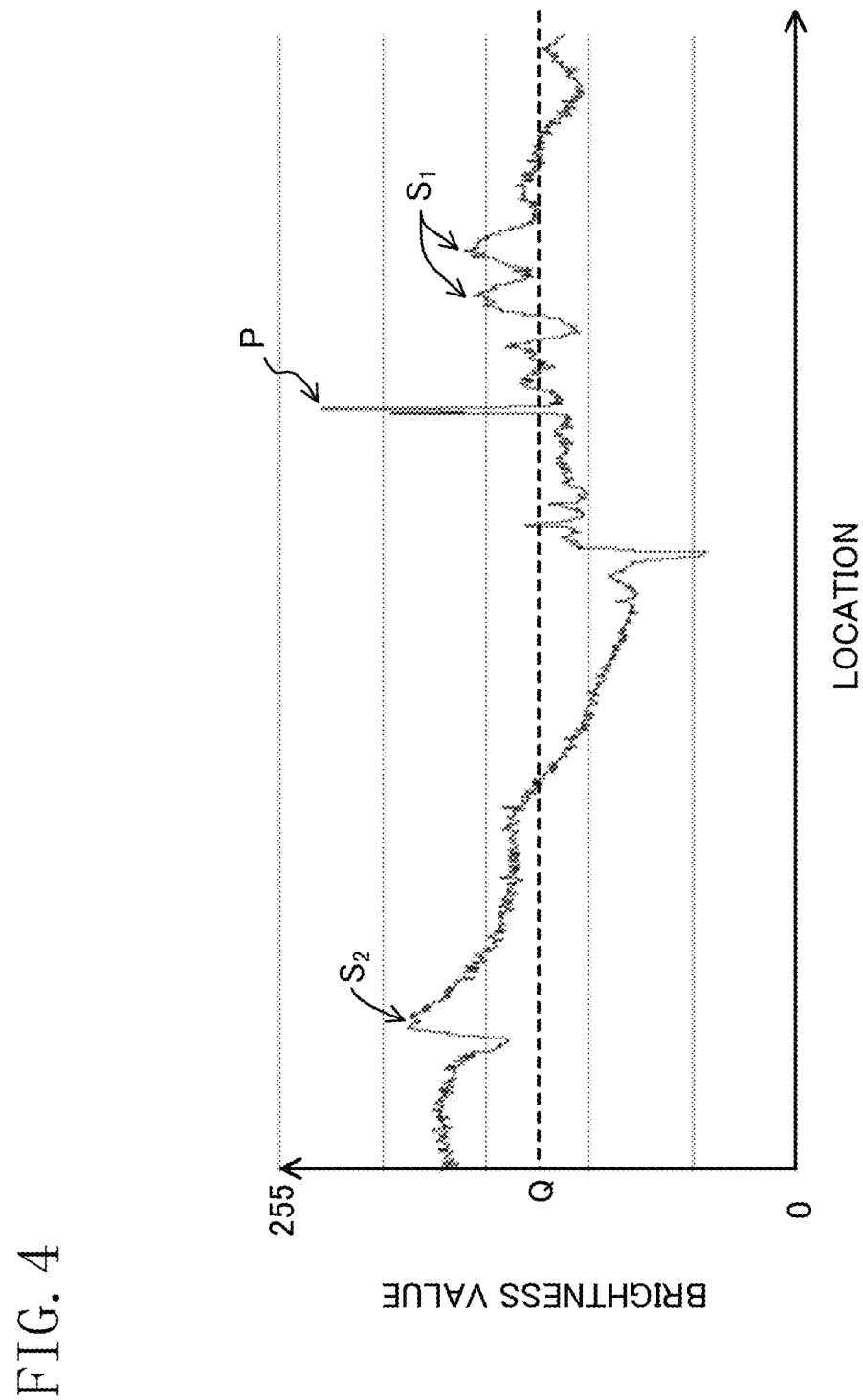
FIG. 4 is a graph showing exemplary brightness values of fluorescence images captured while excitation light was projected to an inner surface of a pail coated with an anticorrosive material.

For example, FIG. 4 is a graph showing exemplary brightness values of a fluorescence image captured by the imager 11 while excitation light was projected to an inner surface of a pail coated with an anticorrosive material.

As shown in FIG. 4, in addition to a sharp peak P, relatively broad peaks $S_1$ and $S_2$ are seen as brightness values higher than the average brightness value Q in the inspection target region. The sharp peak P results from a foreign substance adhering to the inner surface of the pail, whereas the broad peaks $S_1$ and $S_2$ result from the fluorescence variations detected due to multiple reflection from the inner surface of the pail. Since such fluorescence variations vary among containers or among inspection target regions, it is difficult to smooth out fluorescence variations by a patterned process.

To address this problem, it is recommended that the detector 13 further include the processor 16 that smooths the fluorescence image captured by the imager 11 in order to be able to detect only foreign substances without being affected by such fluorescence variations.

Figure 5:
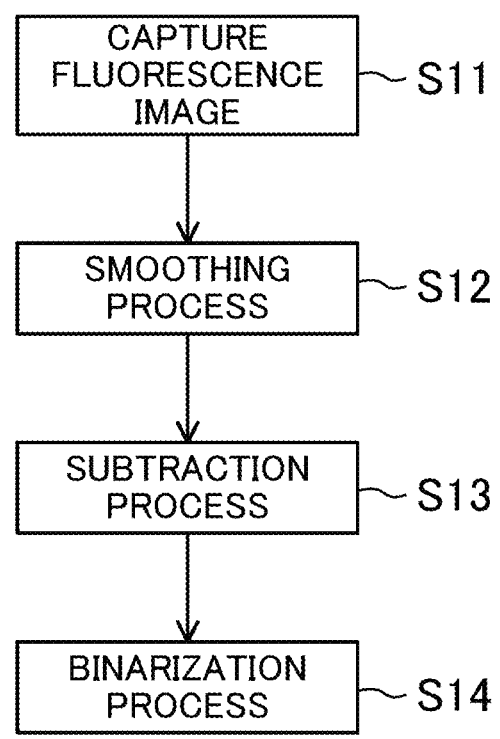
FIG. 5 is a flowchart showing a procedure for smoothing out fluorescence variations among the brightness values of the fluorescence images.

FIG. 5 is a flowchart showing a procedure for smoothing out fluorescence variations among the brightness values of the fluorescence image captured by the imager 11.

First, in step S11, the imager 11 captures a fluorescence image of fluorescence emitted by the excitation light projected from the light source 10 into the container 20.

Next, in step S12, the fluorescence image captured by the imager 11 is smoothed. The smoothing process can be performed by a known method. However, it can be performed using a median filter, for example.

Next, in step S13, a subtraction process is performed to remove the difference between the fluorescence image captured by the imager 11 and the smoothed image. Thus, fluorescence variations among the brightness values of the fluorescence image captured by the imager 11 are smoothed out.

Further, binarization is performed using a subtraction image obtained in step S13 (step S14). Thus, a region including foreign substances can be extracted from the fluorescence image captured by the imager 11, and only the foreign substances adhering to the inner surface 20A of the container 20 can be detected without being affected by the fluorescence variations.

Figure 6A:
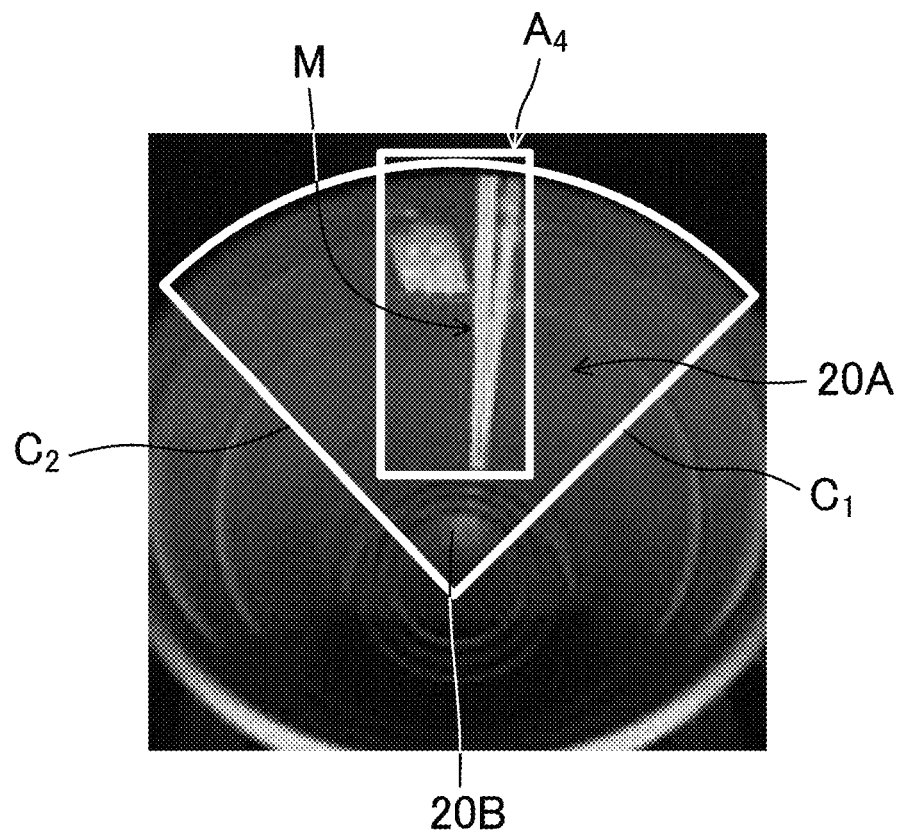
FIG. 6A illustrates an example of a fluorescence image of the inner surface of the pail coated with the anticorrosive material.

FIG. 6A illustrates an example of a fluorescence image of the inner surface of the pail coated with the anticorrosive material. Here, reference characters 20A and 20B denote a side surface 20A and a bottom portion 20B of the pail, respectively. In the range of vision between the lines $C_1$ and $C_2$, the inspection target region is divided into regions $A_1$ to $A_7$ and the bottom portion 20B.

Figure 6B:
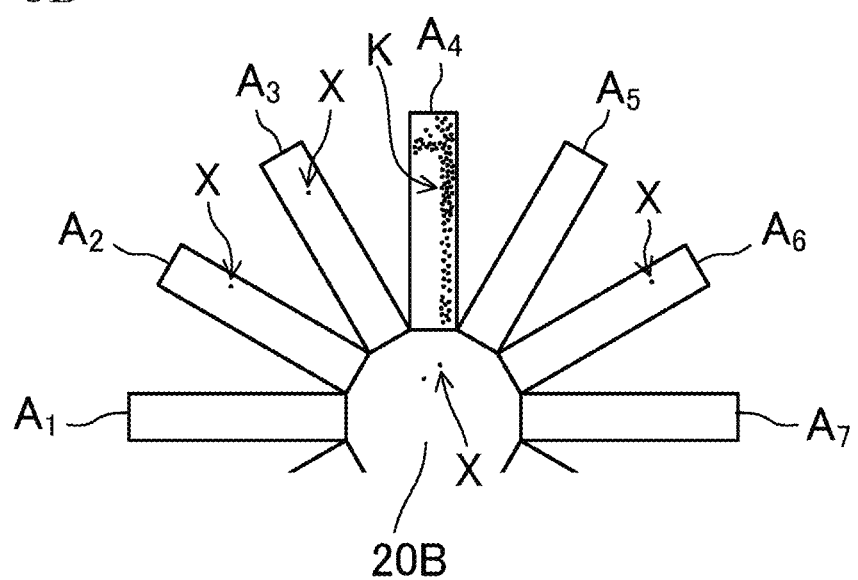
FIG. 6B illustrates the result of detection of foreign substances adhering to the inner surface of the pail from the fluorescence image illustrated in FIG. 6A.

FIG. 6B illustrates the result of detection of foreign substances adhering to the inner surface of the pail from the fluorescence image illustrated in FIG. 6A, the detection carried out in accordance with the procedure shown in FIG. 3. Here, the regions denoted by the reference characters $A_1$ to $A_7$ are obtained by developing the side surface 20A of the pail into the inspection target regions. As shown in FIG. 6B, a minute foreign substance X is detected in each of the regions $A_2$, $A_3$, and $A_6$ and the bottom portion 20B, whereas in the region $A_4$, many dummy foreign substances K are detected. This region $A_4$ includes a joint M at which the lateral edges of the side surface 20A of the pail are joined together and from which the amount of fluorescence is very large. As a result, such a large amount of fluorescence is detected as dummy foreign substances K.

To prevent such dummy foreign substances K from being detected as foreign substances, it is recommended that the detector 13 further include the determining section 18 that compares the number of the adhering foreign substances measured by the measurement section 17 with the preset reference value. The determining section 18 compares the number of the adhering foreign substances measured by the measurement section 17 with the preset reference value varied among the inspection target regions (i.e., the reference value optimized for each inspection target region). For example, in the example shown in FIG. 6B, in the region $A_4$, the reference value is set to be higher than the reference value in each of the other regions $A_1$ to $A_3$ and $A_5$ to $A_7$. This can prevent the dummy foreign substances K from being detected as foreign substances in the region $A_4$. Alternatively, the region $A_4$ may be excluded from the inspection target regions. In a region free of the dummy foreign substances K, the reference value may be set to be zero. If, in this case, any foreign substance is detected, a determination is made that this region is in an abnormal state.

Further, the region $A_4$ including the dummy foreign substances K has a high average brightness value. Thus, if the image-capturing condition is adjusted such that the average brightness value in this region $A_4$ is lower than the average brightness value in the other regions $A_1$ to $A_3$ and $A_5$ to $A_7$, the dummy foreign substances K can be prevented from being detected as foreign substances in the region $A_4$.

As can be seen, if the inspection target regions of the inner surface of the container illuminated with the excitation light include regions with different average brightness values, the image-capturing condition where a fluorescence image is captured is preferably adjusted for each inspection target region such that the average brightness value falls within the preset range. This allows foreign substances to be further accurately detected.

As described with reference to FIGS. 2A to 2C, even if the inner surface 20A of the container 20 is coated with a fluorescent material, adjusting the image-capturing condition where a fluorescence image is captured enables detection of a minute foreign substance adhering to the inner surface 20A of the container 20 without being affected by the fluorescence from the inner surface 20A of the container 20.

Even if the foreign substance adhering to the inner surface 20A of the container 20 is made of a material that does not emit fluorescence in response to excitation light projected thereto (such as a metal or an inorganic material), the same principle allows a foreign substance that does not emit fluorescence (a second foreign substance) X2 to be detected from the fluorescence image captured by the imager 11. The principle will now be described with reference to FIGS. 7A to 7C.

Figure 7A:
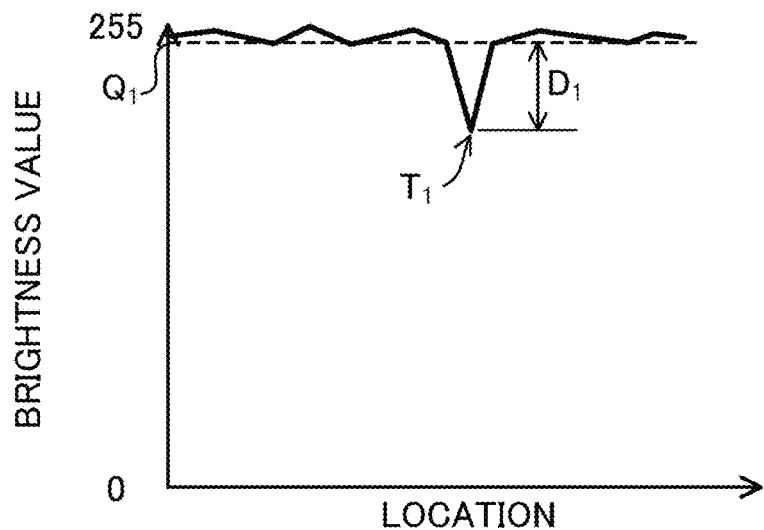
FIGS. 7A to 7C are graphs showing variations in brightness value of a fluorescence image captured under different image-capturing conditions in an inspection target region.
Figure 7B:
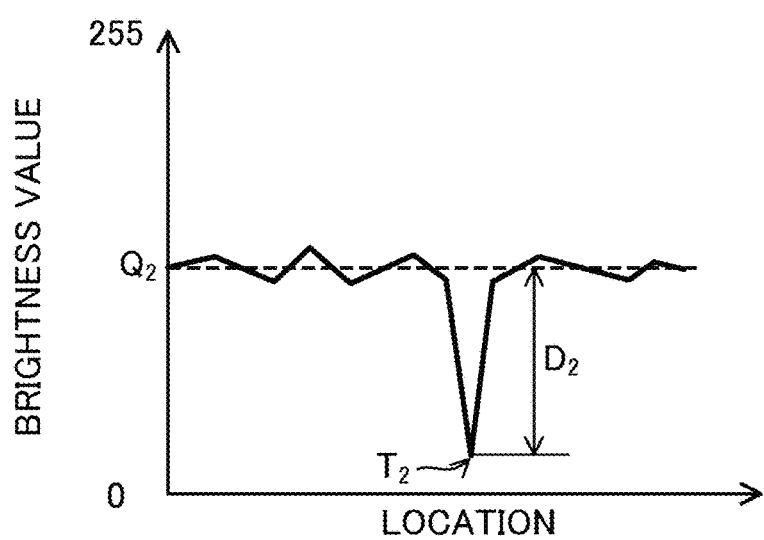
Figure 7C:
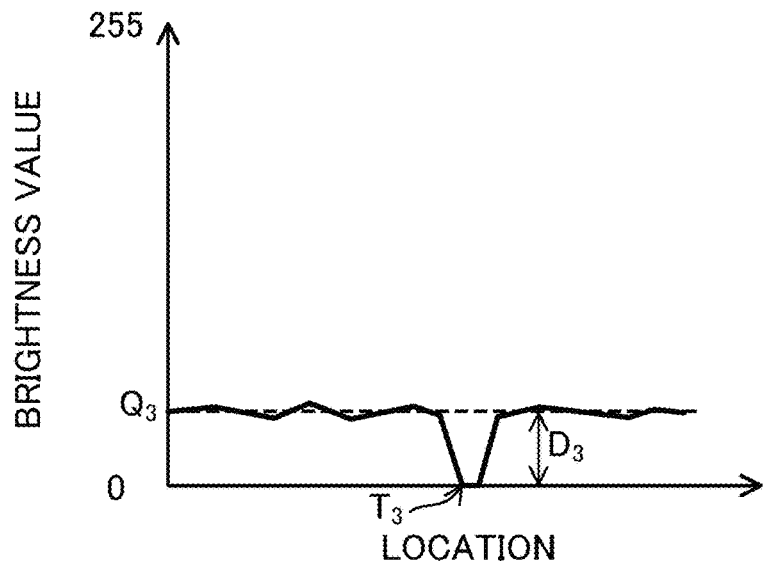

Here, FIGS. 7A to 7C are graphs showing variations among brightness values of fluorescence images in the inspection target region captured under different exposure times as an image-capturing condition where the fluorescence image is captured. The exposure time is shortened in the order of FIGS. 7A to 7C. In the graphs, the values $T_1$ to $T_3$ each indicate the brightness value of fluorescence from the second foreign substance X2, and the values $Q_1$ to $Q_3$ each indicate an average brightness value, calculated by the calculator 14, in the inspection target region.

As shown in FIG. 7A, a long exposure time increases the average brightness value $Q_1$, and the difference $D_1$ between the average brightness value $Q_1$ and the brightness value $T_1$ of the fluorescence from the second foreign substance X2 is small. This is because an excessively long exposure time saturates the average brightness value $Q_1$, and increases the amount of the fluorescence from the second foreign substance X2, and the brightness value $T_1$ of the fluorescence from the second foreign substance X2 approaches the upper limit (255) of the level of gray scale of the imager 11.

On the other hand, as shown in FIG. 7B, a shorter exposure time reduces the average brightness value $Q_2$, whereas the brightness value $T_2$ of the fluorescence from the second foreign substance X2 further significantly decreases. This is because the average brightness value $Q_2$ is not saturated, and the fluorescence that is emitted from the inspection target region is correctly detected by the imager 11. As a result, the difference $D_2$ between the brightness value $T_2$ of the fluorescence from the second foreign substance X2 and the average brightness value $Q_2$ increases.

However, as shown in FIG. 7C, a still shorter exposure time further reduces the average brightness value $Q_3$, whereas the brightness value $T_3$ of the fluorescence from the second foreign substance X2 does not decrease so much. This is because an excessively short exposure time excessively reduces the amount of the fluorescence from the second foreign substance X2, and the brightness value $T_3$ approaches the lower limit (0) of the level of gray scale of the imager 11. As a result, the difference $D_3$ between the brightness value $T_3$ of the fluorescence from the foreign substance X2 and the average brightness value $Q_3$ is again reduced.

As can be seen, an excessively long or short exposure time reduces the difference between the brightness value of the fluorescence from the second foreign substance X2 and the average brightness value. In some cases, the brightness value of the fluorescence from the second foreign substance X2 is substantially equivalent to the average brightness value. Capturing a fluorescence image under such an image-capturing condition makes it difficult to detect the second foreign substance X2 with the brightness value of the fluorescence from the second foreign substance X2 distinguished.

On the other hand, if the image-capturing condition (exposure time) where the fluorescence image is captured is adjusted such that the average brightness value, calculated by the calculator 14, in the inspection target region falls within the preset range, the second foreign substance X2 can be detected with the brightness value of the fluorescence from the second foreign substance X2 distinguished. Thus, even if the inner surface 20A of the container 20 is coated with a fluorescent material, and a foreign substance that does not emit fluorescence (a second foreign substance) X2 adheres to the coated surface, the second foreign substance X2 adhering to the inner surface 20A of the container 20 can be detected without being affected by fluorescence from the inner surface 20A of the container 20.

Note that the above-described image-capturing condition is appropriately set in accordance with previously conceivable foreign substances. For example, an image-capturing condition used to detect the same or similar foreign substance in a container may be used as a temporary condition for another container.

Alternatively, if a plurality of types of foreign substances are present, and include foreign substances imaged as bright spots and foreign substances imaged as dark spots, the image-capturing condition is preferably adjusted in advance such that the average brightness value falls within the range from ¼ of a maximum brightness value $B_M$ to ¾ thereof.

Other Embodiments of Present Invention

As described above, even if the inner surface 20A of the container 20 is coated with a fluorescent material, the inspection device 1 according to the present invention can detect a minute foreign substance adhering to the inner surface 20A of the container 20 without being affected by fluorescence from the inner surface 20A of the container 20. Thus, this inspection device 1 can be used to quantitatively detect residues adhering to the inner surface 20A of a cleaned container 20 on a production line along which the container 20 is filled with a lubricant, before the filling of the container 20 with the lubricant. As a result, comparing the number of adhering residues detected with the preset reference value allows a determination to be made whether or not cleaning is successfully performed.

Figure 8:
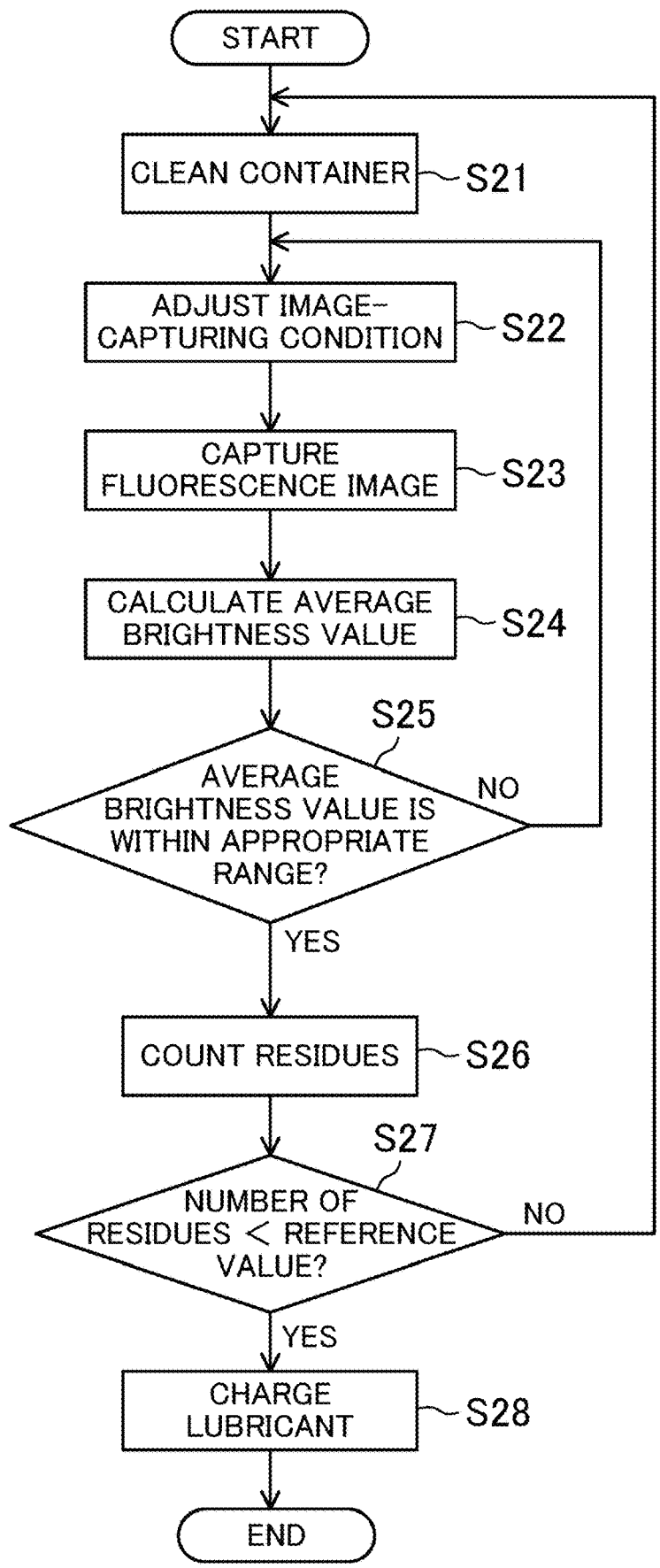
FIG. 8 is a flowchart showing process steps in a production management method according to another embodiment of the present invention.

FIG. 8 is a flowchart showing process steps in a production management method according to another embodiment of the present invention. The production management method according to this embodiment is applicable to a production line for filling a container such as a pail with a lubricant.

In step S21, the container 20 is cleaned before being filled with the lubricant. The inner surface 20A of the container 20 is coated with an anticorrosive material. Since this anticorrosive material is made of a material containing an organic substance, projecting excitation light to the inner surface 20A of the container 20 triggers emission of fluorescence.

Next, in steps S22 to S26, the number of residues remaining on the inner surface 20A of the cleaned container 20 is counted by the same procedure as the steps S1 to S5 described with reference to FIG. 3.

Next, in step S26, the number of the residues is compared with a preset reference value to determine whether or not cleaning has been successfully performed. If the number of the residues is greater than the preset reference value, a determination is made that cleaning has not been successfully performed, and the step of cleaning the container (step S21) is performed again. If the number of the residues is less than the preset reference value, the container 20 is filled with the lubricant (step S27).

The production management method of this embodiment allows the residues adhering to, and remaining in, the cleaned container 20 to be quantitatively detected before the filling of the container 20 with the lubricant. Thus, an accurate determination can be made whether or not the container 20 has been successfully cleaned. This can prevent a foreign substance in the lubricant with which the container 20 is filled, and allows production control with high quality.

In particular, if a foreign substance has entered the container 20 that is about to be filled with a lubricant, or remains in the container 20 due to inadequate cleaning, a finished product corresponding to the container filled with the lubricant significantly adversely affects the quality of a lubricant product due to the foreign substance that has entered the container. Thus, foreign substances need to be prevented from entering the container. Since the lubricant is usually in a liquid or semi-solid state, once a foreign substance has entered the lubricant, it is substantially impossible to remove the foreign substance, in view of the production process and the cost for this removal. Thus, although the present device is useful also for a container to be filled with a material other than a lubricant, the use of the inspection device 1 according to the present invention, in particular, for a container to be filled with a lubricant and the application of the production management method to the production line are very useful. This is because foreign substances that have entered the lubricant as described above are difficult to remove.

The present invention has been described based on the foregoing preferred embodiments. These embodiments do not limit the present invention, and may be variously changed or modified.

For example, ultraviolet light is used as excitation light in the foregoing embodiments. However, if a foreign substance to be inspected emits fluorescence in response to visible light projection, visible light may be used as the excitation light.

In the foregoing embodiments, an example in which the inner surface 20A of the container 20 is coated with a material emitting fluorescence in response to the excitation light projected thereto has been described. However, the container 20 may be made of a material emitting fluorescence in response to the excitation light projected thereto. Even if the container 20 is made of a material that does not emit fluorescence in response to the excitation light projected thereto, the present invention provides advantages also in the case of the inner surface 20A of the container 20 changing with time through the use of the container 20 to emit fluorescence.

DESCRIPTION OF REFERENCE CHARACTERS

1 Inspection Device
10 Light Source
11 Imager
12 Coupling Member
13 Detector
14 Calculator
15 Adjuster
16 Processor
17 Measurement Section
18 Determining Section
20 Container

What is claimed is:

1. An inspection device for inspecting a foreign substance adhering to an inner surface of the container, the device comprising:
a light source projecting excitation light to the inner surface of the container;
an imager capturing a fluorescence image of fluorescence emitted from the foreign substance in response to the excitation light projected; and
a detector detecting the foreign substance adhering to the inner surface of the container from the fluorescence image captured by the imager, wherein
the foreign substance contains a material emitting fluorescence in response to excitation light projected thereto,
the detector includes
a calculator calculating an average brightness value of the excitation light projected to the inner surface of the container in an inspection target region based on the fluorescence image captured by the imager, and
an adjuster adjusting an image-capturing condition where the fluorescence image is captured such that the average brightness value calculated by the calculator falls within a preset range,
a quantized brightness value of the fluorescence image captured by the imager is measured, and
the adjuster previously adjusts the image-capturing condition where the fluorescence image is captured such that the average brightness value falls within a range from ¼ of a maximum brightness value $B_M$ to ¾ of the maximum brightness value $B_M$.

2. The device of claim 1, wherein
the inner surface of the container is coated with a material emitting fluorescence in response to excitation light projected thereto, or the container is made of a material emitting fluorescence in response to excitation light projected thereto.

3. The device of claim 2, wherein
the detector further includes a processor smoothing the fluorescence image captured by the imager, and
the detector detects the foreign substance adhering to the inner surface of the container using a subtraction image between the fluorescence image captured by the imager and the image smoothed by the processor.

4. The device of claim 2, wherein
the detector further includes a measurement section measuring a location of the foreign substance adhering to the inner surface of the container and the number of the foreign substance adhering, based on the fluorescence image captured by the imager.

5. The device of claim 4, wherein
the detector further includes a determining section comparing the number of the foreign substance measured by the measurement section with a preset reference value, and
if the inner surface of the container to which the excitation light is projected has a plurality of inspection target regions, the determining section varies the preset reference value among the inspection target regions of the inner surface of the container to which the excitation light is projected, and compares the number of the foreign substance measured by the measurement section with the reference value varied.

6. The device of claim 2, wherein
if the inner surface of the container to which the excitation light is projected has a plurality of inspection target regions, the image-capturing condition where the fluorescence image is captured is adjusted for each inspection target region such that the average brightness value falls within the preset range.

7. The device of claim 2, wherein
the foreign substance includes a second foreign substance made of a material that does not emit fluorescence in response to the excitation light projected thereto, and
the adjuster adjusts the image-capturing condition where the fluorescence image is captured such that the average brightness value calculated by the calculator falls within a preset range adapted to the second foreign substance.

8. The device of claim 1, wherein
the detector further includes a processor smoothing the fluorescence image captured by the imager, and
the detector detects the foreign substance adhering to the inner surface of the container using a subtraction image between the fluorescence image captured by the imager and the image smoothed by the processor.

9. The device of claim 1, wherein
the detector further includes a measurement section measuring a location of the foreign substance adhering to the inner surface of the container and the number of the foreign substance adhering, based on the fluorescence image captured by the imager.

10. The device of claim 9, wherein
the detector further includes a determining section comparing the number of the foreign substance measured by the measurement section with a preset reference value, and
if the inner surface of the container to which the excitation light is projected has a plurality of inspection target regions, the determining section varies the preset reference value among the inspection target regions of the inner surface of the container to which the excitation light is projected, and compares the number of the foreign substance measured by the measurement section with the reference value varied.

11. The device of claim 1, wherein
if the inner surface of the container to which the excitation light is projected has a plurality of inspection target regions, the image-capturing condition where the fluorescence image is captured is adjusted for each inspection target region such that the average brightness value falls within the preset range.

12. The device of claim 1, wherein
the foreign substance includes a second foreign substance made of a material that does not emit fluorescence in response to the excitation light projected thereto, and
the adjuster adjusts the image-capturing condition where the fluorescence image is captured such that the average brightness value calculated by the calculator falls within a preset range adapted to the second foreign substance.

13. The device of claim 1, wherein
the container is a container to be filled with a lubricant.

14. A production management method for a production line along which a container is filled with a lubricant, the method comprising:

a cleaning step of cleaning an inner surface of the container before filling the container with the lubricant; and
an inspection step of inspecting a residue adhering to the inner surface of the container after the cleaning step, wherein
the residue contains a material emitting fluorescence in response to excitation light projected thereto,
the inspection step includes sub-steps of:
    projecting excitation light to the inner surface of the container;
    capturing a fluorescence image of fluorescence emitted from the residue in response to the excitation light projected; and
    calculating an average brightness value of the excitation light projected to the inner surface of the container in an inspection target region based on the fluorescence image captured; and
    detecting the residue adhering to the inner surface of the container from the fluorescence image captured,
a quantized brightness value of the captured fluorescence image is measured, and
an image-capturing condition where the fluorescence image is captured is adjusted such that the average brightness value calculated falls within a range from $\frac{1}{4}$ of a maximum brightness value $B_M$ to $\frac{3}{4}$ of the maximum brightness value $B_M$.

15. The method of claim 14, wherein
the inspection step further includes sub-steps of:
    measuring the number of the residue adhering to the inner surface of the container based on the fluorescence image captured, and
    comparing the measured number of the residue with a preset reference value to determine whether or not cleaning is successfully performed in the cleaning step.

16. The method of claim 15, wherein
the inner surface of the container is coated with an anticorrosive material.

17. The method of claim 14, wherein
the inner surface of the container is coated with an anticorrosive material.

* * * * *